United States Patent [19]
Nakamura et al.

[11] Patent Number: 5,497,044
[45] Date of Patent: Mar. 5, 1996

[54] SUPPORTING STRUCTURE FOR A VIBRATOR

[75] Inventors: Takeshi Nakamura; Yoshiaki Heinouchi; Takayuki Kaneko, all of Nagaokakyo, Japan

[73] Assignee: Murata Manufacturing Co., Ltd., Kyoto, Japan

[21] Appl. No.: 345,356

[22] Filed: Nov. 18, 1994

Related U.S. Application Data

[63] Continuation of Ser. No. 167,488, Dec. 16, 1993, abandoned.

[30] Foreign Application Priority Data

Jan. 8, 1993 [JP] Japan ................. 5-018164

[51] Int. Cl.$^6$ ........................................... G01C 19/56
[52] U.S. Cl. ..................... 310/348; 310/321; 310/326; 310/351; 310/353
[58] Field of Search ............................ 310/321, 326, 310/348, 351, 353

[56] References Cited

U.S. PATENT DOCUMENTS 2,470,609  5/1949  Elmore et al. ................... 310/351
3,678,309  7/1972  Choffat .......................... 310/348
4,027,181  5/1977  Moreillon et al. ............... 310/326
4,686,324  8/1987  Debaisieux et al. .............. 310/348
5,256,929  10/1993 Terajima ......................... 310/326

FOREIGN PATENT DOCUMENTS 5118855  5/1993  Japan ........................ 310/348

Primary Examiner—Thomas M. Dougherty
Attorney, Agent, or Firm—Nikaido, Marmelstein, Murray & Oram

[57] ABSTRACT

A vibrator 12 includes a regular triangular prism-shaped vibrating body 14. Center portions of two supporting members 18a and 18b are fixed to the vibrating body 14. One supporting member 18a includes a linear intermediate portion 20a extending in a widthwise direction (y-axis direction) of the vibrator 12, and two linear leg portions 22a and 22a bend downward from both ends of the intermediate portion 20a. In this case, a distance W' between tips of the two leg portions 22a and 22a is expanded wider than a length W of the intermediate portion 20a. Similarly, the other supporting member 18b also includes a linear intermediate portion 20b and two leg portions 22b and 22b, a distance between tips of which is expanded.

11 Claims, 5 Drawing Sheets

SUPPORTING STRUCTURE FOR A VIBRATOR

This application is a continuation of application Ser. No. 08/167,488 filed Dec. 16, 1993 now abandoned.

BACKGROUND OF THE INVENTION

1. Field of the Invention

The present invention relates to a supporting structure for a vibrator, and particularly, to a supporting structure for a vibrator used, for example, in a vibratory gyroscope for detecting a rotational angular velocity.

2. Description of the Prior Art

FIG. 11 is a perspective view showing an example of a conventional vibratory gyroscope which is a background of the present invention, and FIG. 12 is a front view thereof. The vibratory gyroscope includes a vibrator 2, which includes, for example, a regular triangular prism-shaped vibrating body 3. On approximate centers of three side faces of the vibrating body 3, piezoelectric elements 4a, 4b and 4c are formed respectively.

To the vicinity of nodal points of the vibrator 2, two U-shaped supporting members 5a and 5b are secured respectively. In this case, center portions of the supporting members 5a and 5b are fixed to one ledge-line portion of the vibrating body 3.

Meanwhile, both ends of one supporting member 5a are fixed to one mounting board 6a, and both ends of the other supporting member 5b are fixed to another mounting board 6b. The mounting boards 6a and 6b are respectively bonded to a supporting base (not shown) such as a work plate via a cushioning material (not shown).

In the vibratory gyroscope 1, a driving signal is applied to the piezoelectric elements 4a and 4b or to the piezoelectric element 4c. Thereby, the vibrating body 3 bends and vibrates in the direction (x-axis direction) perpendicular to the face whereon the piezoelectric element 4c is formed. When the vibrating body 3 rotates about the center axis (z-axis) in this state, the bending and vibrating direction is changed by a Coriolis force, and a difference is produced in output signals of the piezoelectric elements 4a and 4b. Thus, a rotational angular velocity can be detected by measuring an output voltage difference between the piezoelectric elements 4a and 4b.

In the vibratory gyroscope 1, though the two supporting members 5a and 5b bend as the vibrator 2 vibrates, since the supporting members 5a and 5b are respectively fixed to the supporting base via the cushioning material and so on, the supporting members 5a and 5b hardly interfere with each other. Thus, the vibration of the vibrator 2 is hardly suppressed by the supporting members 5a and 5b, it can be expected to secure a stable vibrating attitude of the vibrator 2.

However, in the vibratory gyroscope 1, the supporting members 5a and 5b are susceptible to a widthwise direction (y-axis direction) of the vibrator 2, and sometimes the supporting members 5a and 5b deflect in the y-axis direction of the vibrator 2 by an expansion or a contraction of the vibrator 2 due to temperature change. In this case, there is a case where a rotational angular velocity can not be detected accurately.

Furthermore, in the vibratory gyroscope 1, when an impact is applied in the lengthwise direction (z-axis direction) of the vibrator 2 by, for example, dropping down, as shown in FIG. 13, the center portions of the supporting members 5a and 5b bend, there is a case where a rotational angular velocity can not be detected accurately.

SUMMARY OF THE INVENTION

It is therefore a primary object of the present invention to provide a supporting structure for a vibrator which is durable against temperature change and impact.

The present invention is directed to a supporting structure for a vibrator having a supporting member for supporting a prism-shaped vibrator, wherein the supporting member includes a linear intermediate portion being fixed to the vibrator and extending in a widthwise direction of the vibrator, and two linear leg portions extending from both ends of the intermediate portion, a distance W' between tips thereof expanding wider than a length W of the intermediate portion.

Meanwhile, a protective stopper for restricting displacement of the supporting member in the lengthwise direction of the vibrator may be provided in the vicinity of the supporting member.

The supporting member hardly deflects in the widthwise direction of the vibrator which is the extending direction of the intermediate portion, and its strength is increased against an impact in the lengthwise direction of the vibrator.

Also, the protective stopper restricts displacement of the supporting member in the lengthwise direction of the vibrator.

According to the present invention, since the supporting member hardly deflects in the widthwise direction of the vibrator which is the extending direction of the intermediate portion even when the vibrator tends to expand and contract due to temperature change, and besides, the strength of the supporting member is increased against the impact in the lengthwise direction of the vibrator, the supporting structure for the vibrator durable to the temperature change and the impact is obtained.

Therefore, when the supporting structure for the vibrator according to the present invention is used in a vibratory gyroscope, a rotational angular velocity can be detected accurately against the temperature change and the impact.

When the protective stopper is provided additionally, it becomes more strong against the impact in the lengthwise direction of the vibrator.

The above and other objects, features, aspects and advantages of the present invention will become more apparent from the following detailed description of the embodiments with reference to the accompanying drawings.

BRIEF DESCRIPTION OF THE DRAWINGS

FIG. 12 is dropped in the lengthwise direction (z-axis direction) of the vibrator.

DESCRIPTION OF THE PREFERRED EMBODIMENTS

Figure 1:
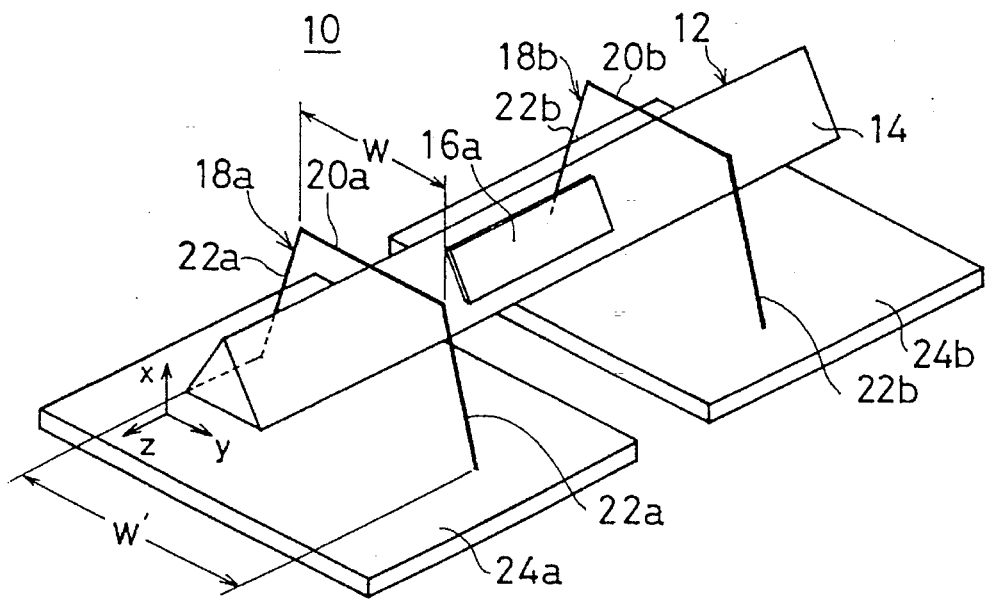
FIG. 1 is a perspective view showing one embodiment of the present invention.
Figure 2:
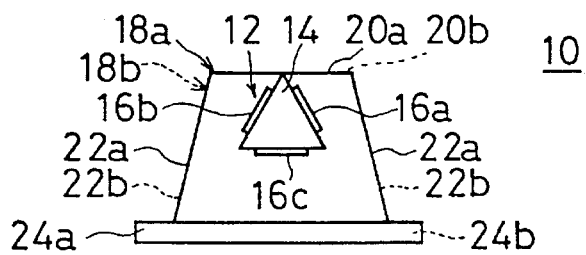
FIG. 2 is a front view of the embodiment shown in FIG. 1.

FIG. 1 is a perspective view showing one embodiment of the present invention, and FIG. 2 is a front view thereof. Though the present invention relates to a supporting structure for a vibrator, in the embodiment, a vibratory gyroscope using a vibrator will be explained.

The vibratory gyroscope 10 includes a vibrator 12, and the vibrator 12 includes, for example, a regular triangular prism-shaped vibrating body 14. The vibrating body 14 is made of a material, which generates generally a mechanical vibration, such as elinver, iron-nickel alloy, quartz, glass, crystal, ceramics or the like. On approximate centers of three side faces of the vibrating body 14, piezoelectric elements 16a, 16b and 16c are formed respectively.

In the vibrator 12, when a driving signal is applied to the piezoelectric elements 16a and 16b or to the piezoelectric element 16c, the vibrating body 14 vibrates in the direction (x-axis direction) perpendicular to the surface of the piezoelectric element 16c. In this case, nodal points of the vibrator 12 are located inward from both ends on the center axis of the vibrating body 14 by respectively 0.224 L, when the longitudinal length of the vibrating body 14 is designated at L.

In the vicinity of the nodal points of the vibrator 12, two supporting members 18a and 18b are fixed. One supporting member 18a includes a linear intermediate portion 20a of 6 mm extending in a widthwise direction (y-axis direction) of the vibrator 12, and two linear leg portions 22a and 22a bend downward from both ends of the intermediate portion 20a. The two leg portions 22a and 22a are gradually expanded as approaching the tips thereof such that a distance therebetween becomes, for example, 9 mm. A straight line connecting the tips of the two leg portions 22a and 22a is spaced from the intermediate portion 20a by, for example, 6 mm. That is, one supporting member 18a looks like removing a lower side from a trapezoid contour of 6 mm upper side, 9 mm lower side and 6 mm height. The other supporting member 18b has a same construction as the supporting member 18a, and includes one intermediate portion 20b and two leg portions 22b, 22b. Center portions of the supporting members 18a and 18b are fixed to the ledge-line portion between the side faces of the vibrating body 14 whereon the piezoelectric elements 16a and 16b are formed, at the portions inward from the both ends by, for example, 0.224 L, by means of welding, bonding or the like.

Furthermore, both ends of one supporting member 18a are fixed to one mounting board 24a consisting of an insulating material such as ceramics. Similarly, both ends of the other supporting member 18b are also fixed to another mounting board 24b having the same construction as the above-mentioned mounting board 24a.

The mounting boards 24a and 24b are respectively bonded with adhesive to a supporting base (not shown) such as a work plate made of, for example, metal, ceramics or the like via a cushioning material (not shown) such as a silicon rubber sheet, a foaming sheet made of silicon resin or the like.

In the embodiment, since the distance between the tips of the leg portions 22a and 22a of the supporting member 18a, and the distance between the tips of the leg portions 22b and 22b of the supporting member 18b are respectively expanded wider than the length of the intermediate portions 20a and 20b of the supporting members 18a and 18b, the supporting members 18a and 18b hardly deflect in the widthwise direction (y-axis direction) of the vibrator 12 which is the extending direction of the intermediate portions 20a and 20b, and are durable against an impact in the lengthwise direction (z-axis direction) of the vibrating body 12. Thus, in the embodiment, a rotational angular velocity can be detected accurately against the temperature change and the impact.

Figure 3:
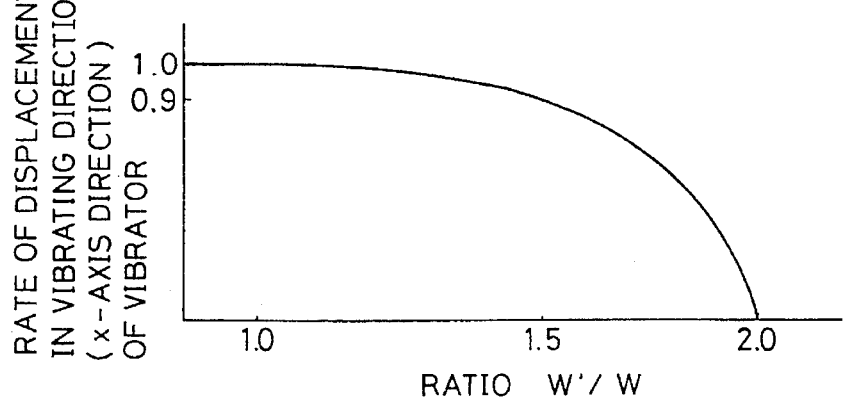
FIG. 3 is a graph showing the relationship between a ratio W'/W of a distance W' between tips of two leg portions of a supporting member and a length W of an intermediate portion, and a rate of displacement in a vibrating direction (x-axis direction) of a vibrator.

An analyzed result using a finite element method of the relationship between a ratio W'/W of a distance W' between the tips of the two leg portions of the supporting member and a length W of the intermediate portion, and a rate of displacement in the vibrating direction (x-axis direction) of the vibrator in the above-mentioned embodiment is shown in FIG. 3. As it is apparent from the result shown in FIG. 3, when the length of the intermediate portions 20a and 20b of the supporting members 18a and 18b, and the height of the supporting members 18a and 18b are the same dimension as the above-mentioned embodiment, and the distance W' between the tips of the two leg portions of the supporting member is not more than 1.5 times of the length W of the intermediate portion of the supporting member, the unnecessary vibration in the widthwise direction (y-axis direction) of the vibrator 12 can be suppressed, without hardly interfering the vibration in the x-axis direction of the vibrator 12 by the piezoelectric elements.

Figure 4:
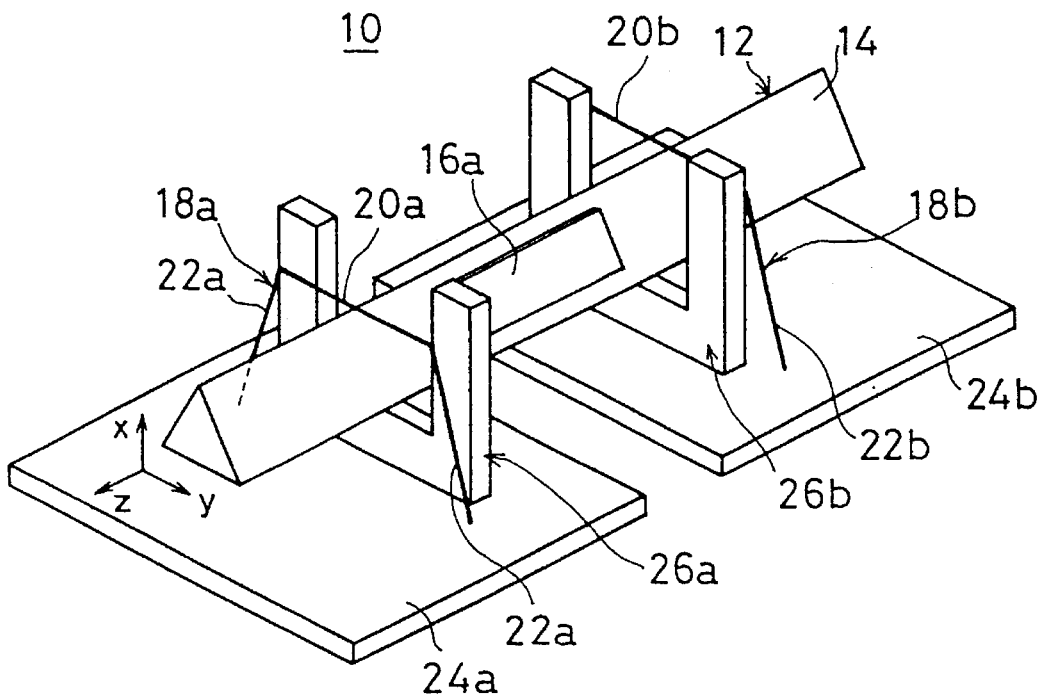
FIG. 4 is a perspective view showing another embodiment of the present invention.
Figure 5:
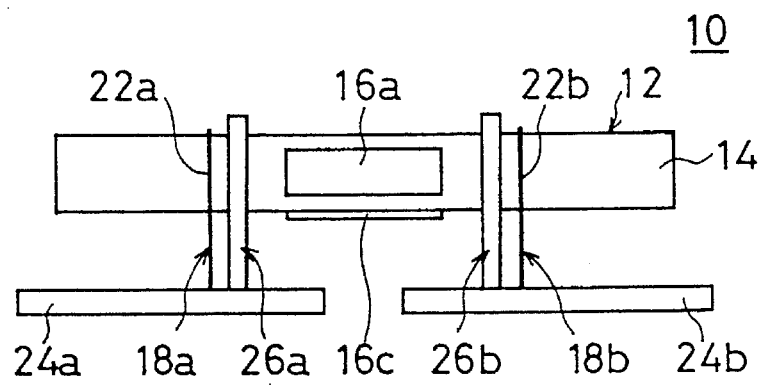
FIG. 5 is a side view of the embodiment shown in FIG. 4.

FIG. 4 is a perspective view showing another embodiment of the present invention and FIG. 5 is a side view thereof. In the embodiment shown in FIG. 4 and FIG. 5, as compared with the embodiment shown in FIG. 1 and FIG. 2, protective stoppers 26a and 26b consisting of a U-shaped metal are, particularly, secured in the vicinity of the supporting members 18a and 18b. In this case, the protective stoppers 26a and 26b are secured to the mounting board 24a and 24b between the supporting members 18a and 18b. Thus, in the embodiment shown in FIG. 4 and FIG. 5, as compared with the embodiment shown in FIG. 1 and FIG. 2, the supporting members 18a and 18b are protected against the impact in the z-axis direction of the vibrator 12. The protective stoppers 26a and 26a may be formed with, besides the metal, a material consisting of a synthetic resin molded metal or a synthetic resin. The protective stoppers 26a and 26b may also be formed respectively in an unity with the mounting boards 24a and 24b.

In order to protect the supporting members 18a and 18b against the impact in the z-axis direction of the vibrator 12, the vibrator 12 and so on may be covered by a case, a portion of which may be disposed in the vicinity of the both ends in the axial direction of the vibrator 12. The supporting members 18a and 18b are protected further against the impact in the z-axis direction of the vibrator 12 by taking such method.

Figure 6:
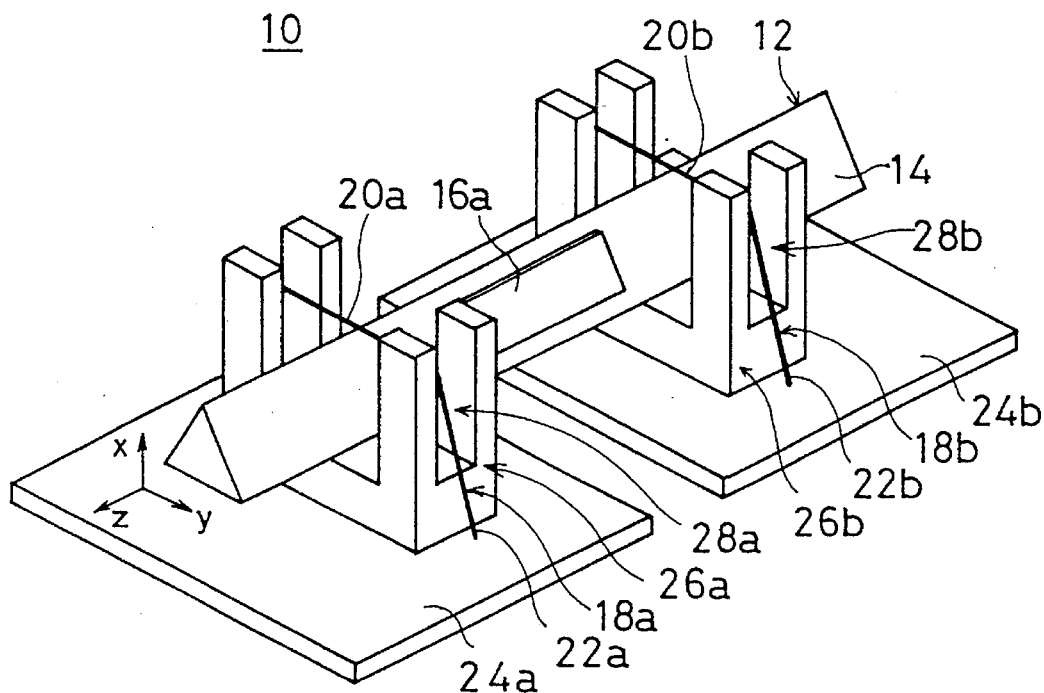
FIG. 6 is a perspective view showing still another embodiment of the present invention.
Figure 7:
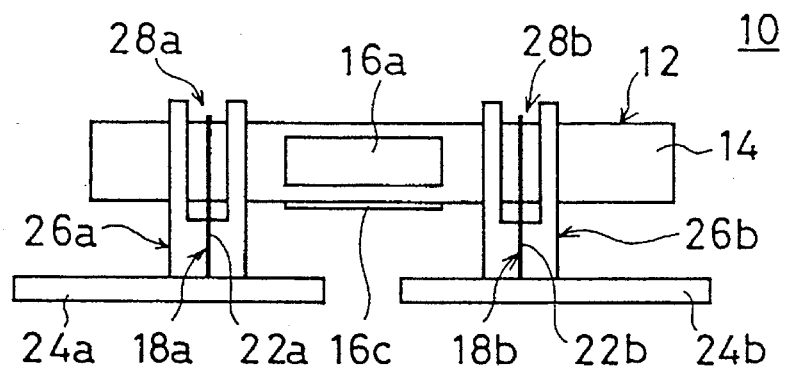
FIG. 7 is a side view of the embodiment shown in FIG. 6.

FIG. 6 is a perspective view showing still another embodiment of the present invention, and FIG. 7 is a side view thereof. In the embodiment shown in FIG. 6 and FIG. 7, as compared with the embodiment shown in FIG. 4 and FIG. 5, particularly, the thickness of the protective stoppers 26a and 26b are thick, and grooves 28a and 28b corresponding to the supporting members 18a and 18b are respectively formed on the protective stoppers 26a and 26b, which are respectively disposed on both sides of the supporting members 18a and 18b. Thus, in the embodiment shown in FIG. 6 and FIG. 7, as compared with the embodiment shown in FIG. 4 and FIG. 5, the supporting members 18a and 18b can be protected still more against the impact in the z-axis direction of the vibrator 12.

Figure 8:
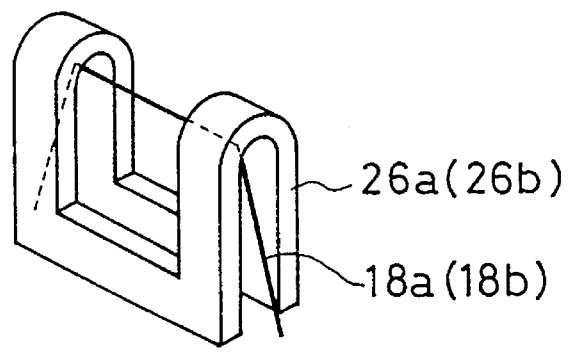
FIG. 8 is a perspective view showing another example of a protective stopper.
Figure 9:
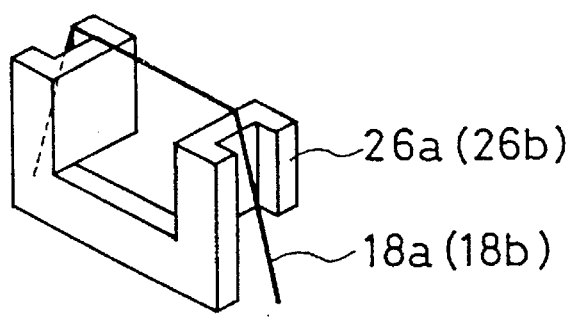
FIG. 9 is a perspective view showing still another example of a protective stopper.
Figure 10:
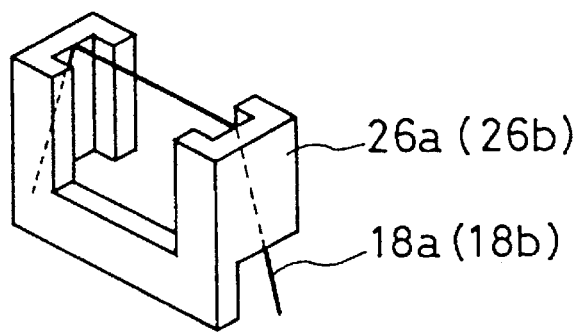
FIG. 10 is a perspective view showing a separate example of a protective stopper.
Figure 11:
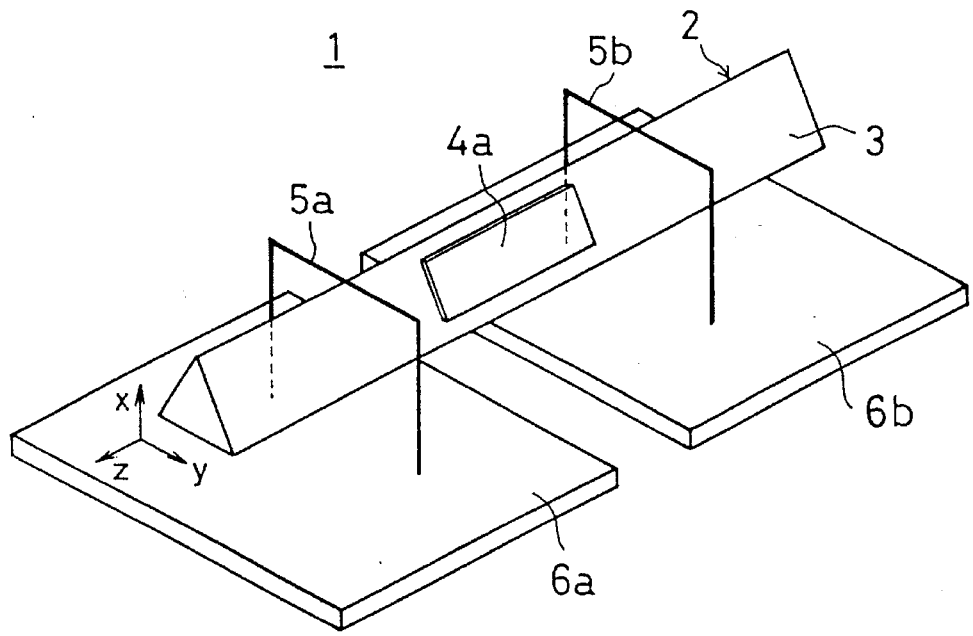
FIG. 11 is a perspective view showing an example of a conventional vibratory gyroscope which is a background of the present invention.
Figure 12:
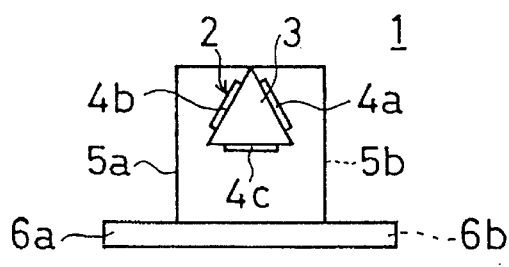
FIG. 12 is a front view of the vibratory gyroscope shown in FIG. 11.
Figure 13:
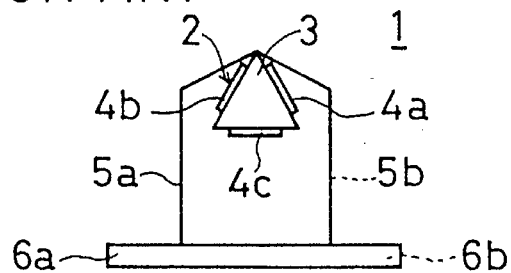
FIG. 13 is a front view showing a state, where the vibratory gyroscope shown in FIG. 11

The protective stopper 26a (26b) is not limited to the shape shown in the embodiments in FIG. 4 to FIG. 7, it may be formed into a shape where a rectangular plate having a rectangular hole in the center is bent into a U-shape as shown in FIG. 8, or as shown in FIG. 9, into a shape where two L-shaped members whose tips are directing outward against each other are provided on two ends of a U-shaped plate, or as shown in FIG. 10, into a shape where two L-shaped members whose tips are directing inward against each other are provided on two ends of a U-shaped plate.

In the above-mentioned embodiments, though the regular triangular prism-shaped vibrating body 14 is used in the vibrator 12, the other prismatic shape such as a quadrangular prism or a column may be used as the shape of the vibrating body 14.

Also, in the above-mentioned embodiments, though having three piezoelectric elements respectively, the number of piezoelectric elements is not restricted to three, it may be increased or decreased when necessary.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A three-dimensional supporting structure for a vibrator having a supporting member for supporting a prism-shaped vibrator above a mounting board, wherein said supporting member comprising:

a straight linear intermediate portion being fixed to said vibrator and extending in a widthwide direction of said vibrator; and two straight linear leg portions extending from both ends of said intermediate portion, each straight leg portion have first and second ends, said second end being a tip fixed to said mounting board, and said first end connected to said straight linear intermediate portion, a distance W' between said tips expanding wider than a length W of said intermediate portion.

2. A supporting structure for a vibrator according to claim 1, wherein a ratio W'/W of the distance W' between said tips of said two leg portions of said supporting member and the length W of said intermediate portion of said supporting member is 1.5 or less.

3. A supporting structure for a vibrator according to claim 1, which further comprises a mounting board to which said tips of said two leg portions of said supporting member are fixed.

4. A supporting structure for a vibrator according to claim 2, which further comprises a mounting board to which said tips of said two leg portions of said supporting member are fixed.

5. A supporting structure for a vibrator according to claim 1, wherein said vibrator is a polygonal prism-shaped vibrator, said intermediate portion is fixed to a ledge-line portion of said vibrator.

6. A supporting structure for a vibrator having a supporting member for supporting a prism-shaped vibrator, wherein said supporting member comprising:

a straight linear intermediate portion being fixed to said vibrator and extending in a widthwide direction of said vibrator;

two straight linear leg portions extending from both ends of said intermediate portion, a distance W' between tips thereof expanding wider than a length W of said intermediate portion; and a protective stopper provided in the vicinity of said supporting member for restricting displacement of said supporting member in the lengthwise direction of the vibrator.

7. A supporting structure for a vibrator according to claim 6, which further comprises a mounting board to which said tips of said two leg portions of said supporting member are fixed, wherein said protective stopper is secured to said mounting board.

8. A supporting structure for a vibrator according to claim 7, wherein said protective stopper is disposed on both sides of said supporting member.

9. A supporting structure for a vibrator having a supporting member for supporting a prism-shaped vibrator, wherein said supporting member comprising:

a straight linear intermediate portion being fixed to said vibrator and extending in a widthwide direction of said vibrator;

two straight linear leg portions extending from both ends of said intermediate portion, a distance W' between tips thereof expanding wider than a length W of said intermediate portion, wherein a ratio W'/W of the distance W' between said tips of said two leg portions of said supporting member and the length W of said intermediate portion of said supporting member is 1.5 or less; and a protective stopper provided in the vicinity of said supporting member for restricting displacement of said supporting member in the lengthwise direction of the vibrator.

10. A supporting structure for a vibrator according to claim 9, which further comprises a mounting board to which said tips of said two leg portions of said supporting member are fixed, wherein said protective stopper is secured to said mounting board.

11. A supporting structure for a vibrator according to claim 10, wherein said protective stopper is disposed on both sides of said supporting member.

* * * * *